US009424078B2

(12) United States Patent
Chakravorty et al.

(10) Patent No.: US 9,424,078 B2
(45) Date of Patent: Aug. 23, 2016

(54) MANAGING HIGH PERFORMANCE COMPUTING RESOURCES USING JOB PREEMPTION

(75) Inventors: Sayantan Chakravorty, Redmond, WA (US); Colin Watson, Kirkland, WA (US); Christopher J. Crall, Seattle, WA (US)

(73) Assignee: Microsoft Technology Licensing, LLC

( * ) Notice: Subject to any disclaimer, the term of this patent is extended or adjusted under 35 U.S.C. 154(b) by 295 days.

(21) Appl. No.: 13/296,141

(22) Filed: Nov. 14, 2011

(65) Prior Publication Data

US 2013/0125129 A1    May 16, 2013

(51) Int. Cl.
| | | |
|---|---|---|
| G06F 9/455 | (2006.01) | |
| G06F 9/46 | (2006.01) | |
| G06F 9/48 | (2006.01) | |
| G06F 9/50 | (2006.01) | |
| G06F 9/52 | (2006.01) | |

(52) U.S. Cl.
CPC ............ *G06F 9/4843* (2013.01); *G06F 9/4881* (2013.01); *G06F 9/50* (2013.01); *G06F 9/52* (2013.01)

(58) Field of Classification Search
None
See application file for complete search history.

(56) References Cited

U.S. PATENT DOCUMENTS

| | | | | |
|---|---|---|---|---|
| 6,353,844 | B1 * | 3/2002 | Bitar et al. | ............ 718/102 |
| 6,721,948 | B1 * | 4/2004 | Morgan | ............ 718/102 |
| 7,448,036 | B2 | 11/2008 | Brenner et al. | |
| 7,536,689 | B2 * | 5/2009 | Mangan | ............ 718/100 |
| 7,752,622 | B1 | 7/2010 | Markov | |
| 7,920,282 | B2 | 4/2011 | Coppinger et al. | |
| 7,937,706 | B2 | 5/2011 | Casotto | |
| 7,984,439 | B2 * | 7/2011 | McConnell | ............ 718/100 |
| 7,984,447 | B1 * | 7/2011 | Markov | ............ 718/103 |
| 2002/0133530 | A1 * | 9/2002 | Koning | ............ 709/102 |
| 2009/0276781 | A1 | 11/2009 | Chan et al. | |
| 2010/0325637 | A1 * | 12/2010 | Radmilac et al. | ............ 718/104 |
| 2012/0096468 | A1 * | 4/2012 | Chakravorty et al. | ............ 718/103 |
| 2012/0144039 | A1 * | 6/2012 | Watson et al. | ............ 709/226 |

OTHER PUBLICATIONS

Stankovic et al., "Implications of Classical Scheduling Results for Real-Time Systems", Jun. 1995.*
Quinn O. Snell, et al., Preemption based backfill—Published Date: 2002, Proceedings: Job Scheduling Strategies for Parallel Processing, Springer Verlag, 2002. Lect. Notes, Computer Science vol. 2537, pp. 24-37.

(Continued)

*Primary Examiner* — Meng An
*Assistant Examiner* — Bradley Teets
(74) *Attorney, Agent, or Firm* — Henry Gabryjelski; Doug Barker; Micky Minhas

(57) ABSTRACT

The preemption of running jobs by other running or queued jobs in a system that has processing resources. The system has running jobs, and queued jobs that are awaiting processing by the system. In a scheduling operation, preemptor jobs are identified, the preemptor jobs being jobs that are candidates for preempting one or more of the running jobs. The preemptor jobs include queued jobs, as well as running jobs that are capable of using more processing resource of the system. One of the other running jobs is preempted to free processing resources for the running job that was identified as a preemptor job. Accordingly, not only may queued jobs preempt running jobs, but currently running jobs may preempt other currently running jobs.

18 Claims, 5 Drawing Sheets

(56) References Cited

OTHER PUBLICATIONS

Y. Zhang, et al., Improving parallel job scheduling by combining gang scheduling and backfilling techniques—Published Date: Aug. 6, 2002 pp. 133-142.

Yun Wang, et al., Scheduling Fixed-Priority Tasks with Preemption Threshold—Published Date: Aug. 6, 2002, Proceedings: Sixth International Conference on Real-Time Computing Systems and Applications, 1999. RTCSA '99, pp. 328-335.

* cited by examiner

MANAGING HIGH PERFORMANCE COMPUTING RESOURCES USING JOB PREEMPTION

BACKGROUND

High performance computing is a term of art in which clusters of servers are used to perform complex processing. Such clusters may even be as large as hundreds or even thousands of servers. Each of such servers may have multiple processing cores. Often, very complex computational jobs may be performed using such clusters. Despite the cluster's ability to perform a large number of processing operations per second, it may perhaps still take a matter of minutes, hours, days, weeks, or even months to solve some computational jobs. Furthermore, processing jobs may be submitted for processing at a much faster rate than the cluster is capable of performing them.

In addition, some processing jobs may be of higher priority than others. Conventional clusters are equipped with schedulers that allow for preemption of lower priority processing jobs by higher priority processing jobs. As the scheduler performs a scheduling pass, the scheduler evaluates queued processing jobs to see if there are any higher priority queued jobs that should preempt a lower priority running job. If there are such higher priority queued jobs, then the lower priority running job that is to be preempted may be caused to stop, freeing up resources for the higher priority queued job. The cluster may then begin processing the higher priority queued job. This improves the chance that higher priority processing jobs will be more quickly begun and completed, as compared to lower priority processing jobs.

BRIEF SUMMARY

At least one embodiment described herein relates to the preemption of jobs in a system that has processing resources. The system has running jobs that are being processed by the system, and queued jobs that are awaiting processing by the system. In a scheduling operation, preemptor jobs are identified, the preemptor jobs being jobs that are candidates for preempting one or more of the running jobs. The preemptor jobs include queued jobs. However, the preemptor jobs also include running jobs that are capable of using more processing resources than they are currently allocated. One or more of the other running jobs are preempted to free processing resources for the running job that was identified as a preemptor job. Accordingly, not only may queued jobs preempt running jobs, but currently running jobs may preempt other currently running jobs.

Such may be particularly useful if, for example, the preemptor running job is a high priority job that was not originally allocated all of the processing resources that could have been allocated to the preemptor running job. Thus, even if a high priority job is begun with less that its full allocation of processing resources, the high priority job may later be allocated more processing resources during the processing of the high priority job.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the preemption of jobs in a system that has processing resources is described. The system has running jobs, and queued jobs that are awaiting processing by the system. In a scheduling operation, preemptor jobs are identified, the preemptor jobs being jobs that are candidates for preempting one or more of the running jobs. The preemptor jobs include queued jobs, as well as running jobs that are capable of using more processing resource of the system. One or more of the other running jobs are preempted to free processing resources for the running job that was identified as a preemptor job. Accordingly, not only may queued jobs preempt running jobs, but currently running jobs may preempt other currently running jobs. First, some introductory discussion regarding computing systems will be described with respect to FIG. 1. Then, the embodiments of the preemption will be described with respect to FIGS. 2 through 5.

Figure 1:
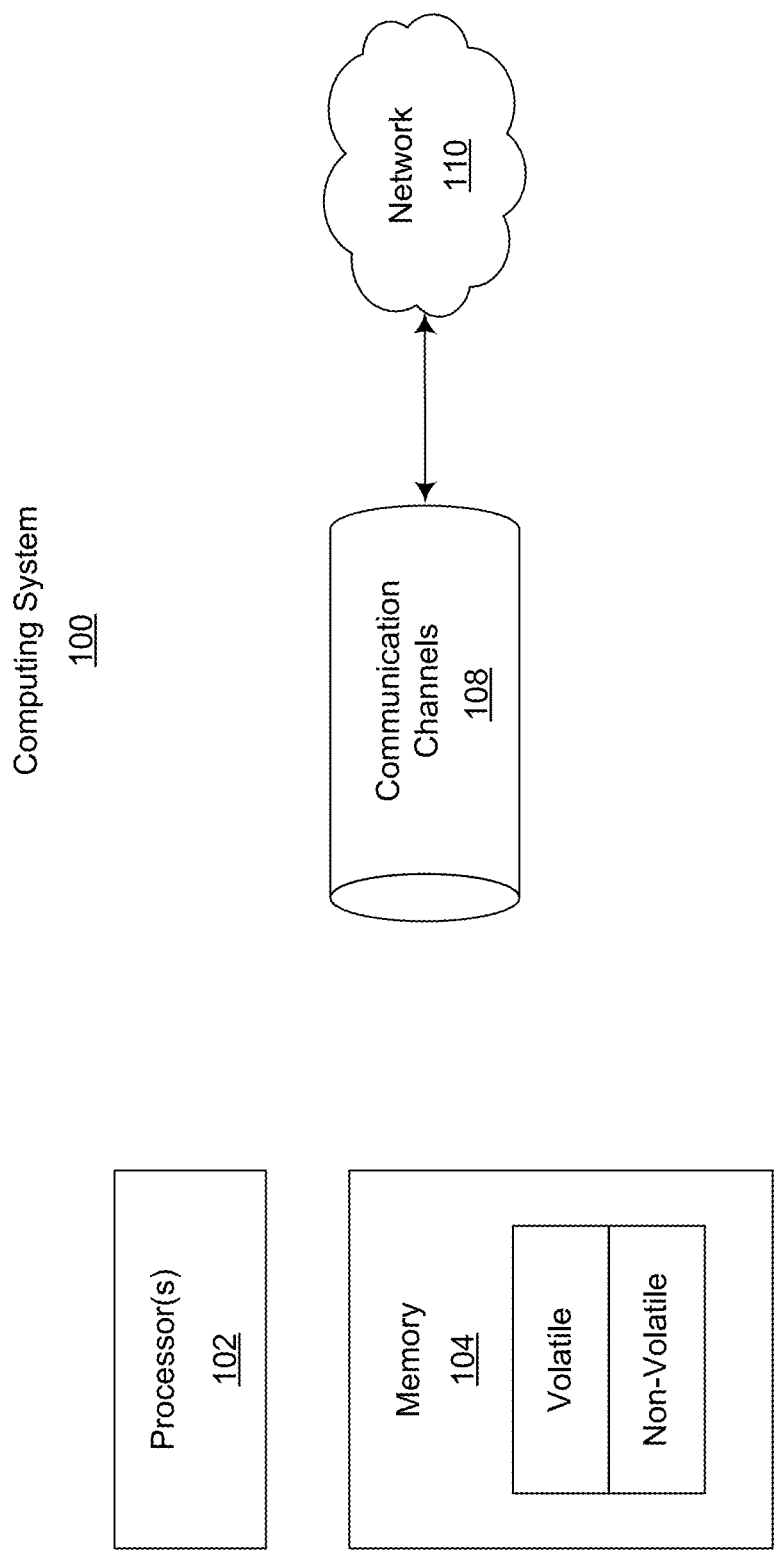
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
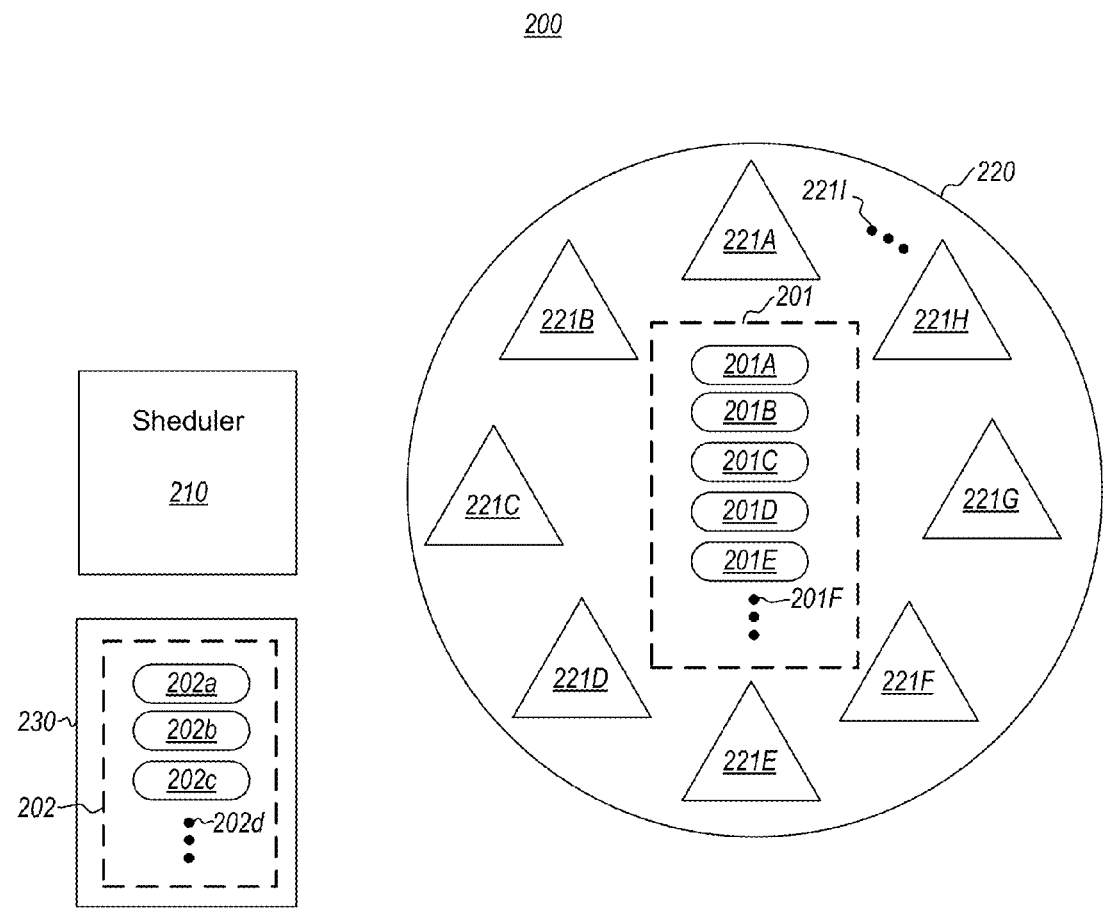
FIG. 2 illustrates a high performance computing environment that includes a scheduler, a system that includes processing resources, wherein the scheduler may be operated by the computing system of FIG. 1.

FIG. 2 illustrates a high performance computing environment 200 that includes a scheduler 210 and a system 220 that includes processing resources 221. As an example, the system 220 may be a high performance computing system, and processing resources 221 may include compute nodes in the high performance computing system. In the illustrated example, the processing resources 221 include eight processing resources 221A through 221H, although the ellipses 221I represent that the system 220 may have any number of processing resources from as few as one, to as many as thousands or millions of processing resources. Regardless of the number of processing resources, the processing resources may be referred to collectively hereinafter as "processing resources 221".

Each processing resource is capable of contributing to the processing of a processing job. Furthermore, each processing job is capable of being processed by one or more processing resources. For instance, referring to FIG. 2, the system 220 is processing running jobs 201. In the illustrated example, the running jobs 201 include five running jobs 201A, 201B, 201C, 201D, 201E. However, the ellipses 201F represent that the system 220 may be running other numbers and identities of jobs without departing from the principles described herein. Regardless of the number of running jobs, the running jobs may be referred to collectively herein as "running jobs 201". Each of the running jobs is assigned to a subset of the processing resources, such that the corresponding subset of processing resources processes the running job. In high performance computing, a running job may be comprised of one or more tasks.

The scheduler 210 has access to a queue 230 that includes queued jobs 202 that are awaiting processing by the system 220. In the illustrated example, there are three queued jobs 202a, 202b and 202c. However, the ellipses 201d represent that there may be other numbers or identities of queued jobs within the queue 230. Regardless of the number of queued jobs, the queued jobs may be referred to collectively herein as "queued jobs 202".

The scheduler 210 schedules the queued jobs 202 for processing as the system 220 becomes able to process the jobs due to previously running jobs reaching completion. In addition, the scheduler 210 may preempt one or more of the currently running jobs 201 so that one or more of the queued jobs 202 may begin being processed by the system 220. In accordance with the principles described herein, the scheduler 210 may also preempt one or more of the currently running jobs 201 so that another higher priority running job may be allocated more processing resources. Accordingly, not only may queued jobs preempt running jobs, but currently running jobs may preempt other currently running jobs. Such may be particularly useful if the preempting running job had not previously been allocated its maximum number of processing resources.

The scheduler 210 may be, for example, implemented as a software component that is instantiated and executed by one or more processors (e.g., processor(s) 102) of a computing system (e.g., computing system 100) executing computer-executable instructions that are structured to cause the scheduler 210 to operate as described herein. The computer-readable media may be, for example, part of a computer program product.

Figure 3:
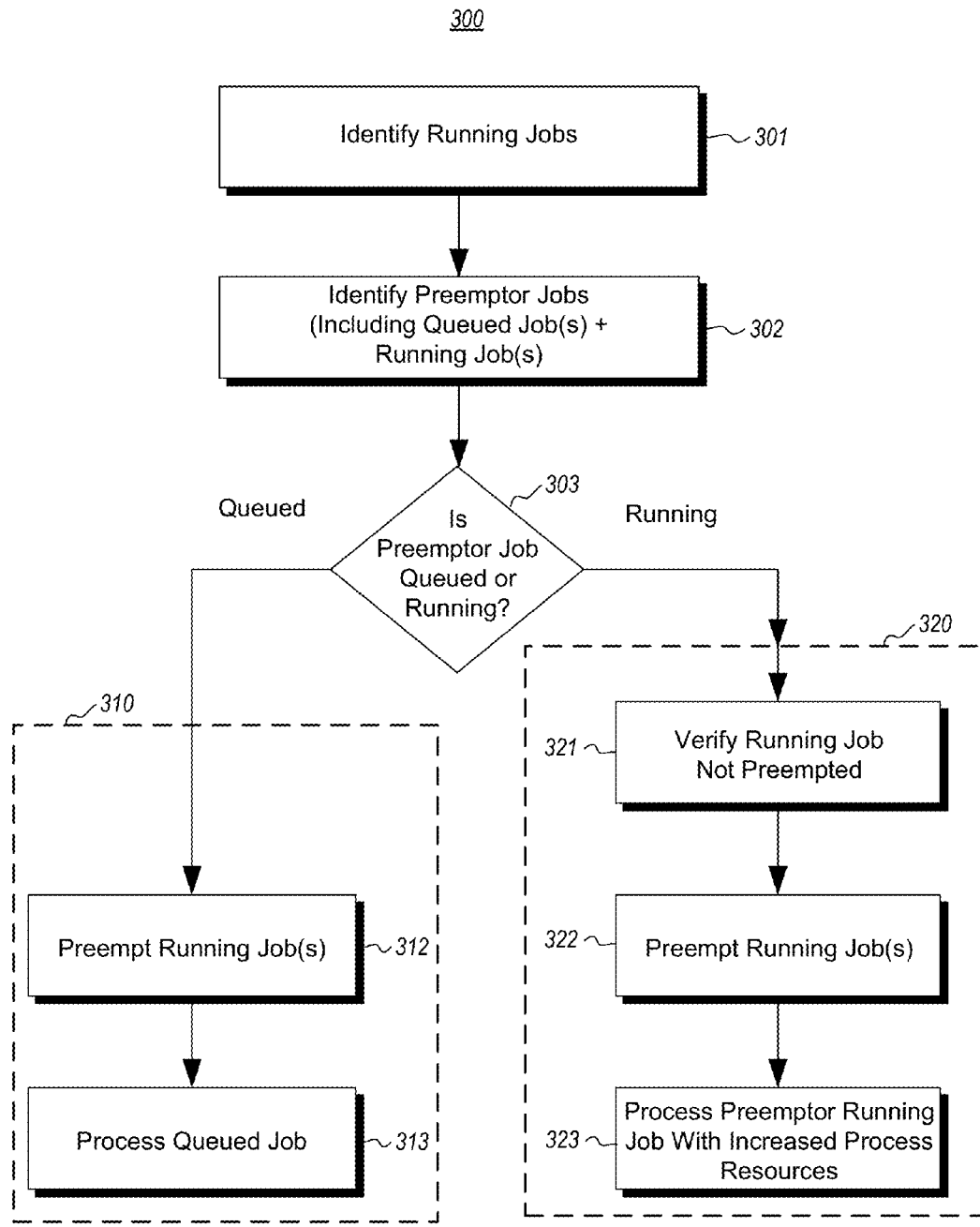
FIG. 3 illustrates a flowchart of a method that may be performed by the scheduler of FIG. 2 to perform a scheduling pass.

FIG. 3 illustrates a flowchart of a method 300 for a scheduler to perform a scheduling pass. As an example, the scheduler that performs the method 300 may be the scheduler 210 of FIG. 2. Accordingly, the method 300 of FIG. 3 will be described with frequent reference to the computing environment 200 of FIG. 2.

The scheduler identifies the running jobs that are currently running in a system that has processing resources (act 301). Referring to FIG. 2, the scheduler 210 identifies the current running jobs 201. The scheduler keeps track of when new processing jobs begin running, and is notified when the processing jobs are complete. Thus, the scheduler 210 may be constantly aware of the identity of each of the currently running jobs. Suppose initially that the running jobs include running jobs 201A, 201B, 201C, 202D, and 201E in an application example. This example will be referred to herein as the "application example".

The scheduler identifies preemptor jobs (act 302) that are candidates for preempting one or more of the identified running jobs. In accordance with the principles described herein, the preemptor jobs include not only one or more queued jobs, but also one or more running jobs. In the application example, suppose initially that the preemptor jobs include all illustrated queued jobs 202a, 202b and 202c, as well as several running jobs 201C and 201D.

The remainder of the method 300 is performed for each preemptor job, and depends on whether the preemptor job is a queued job ("Queued" in decision block 303) or running ("Running" in decision block 303). Specifically, the acts 312 and 313 encompassed by dashed-lined box 310 may be performed for each queued job within the preemptor jobs. Furthermore, the acts 321, 322 and 323 encompassed by dashed-lined box 320 may be performed for each of the running jobs within the preemptor jobs.

If the preemptor job is a queued job ("Queued" in decision block 303), then one or more of the running jobs are preempted (act 312), allowing the queued job to be processed (act 313). If the preemptor job is a running job ("Running" in decision block 303), then one or more of the other running jobs are preempted (act 322), allowing the preemptor running job to be processed with a greater number of processing resources (act 323). However, it is first verified that the preemptor job has not already been preempted by another job (act 321). It may also be ensured that the preemptor running job does not preempt itself.

Figure 4:
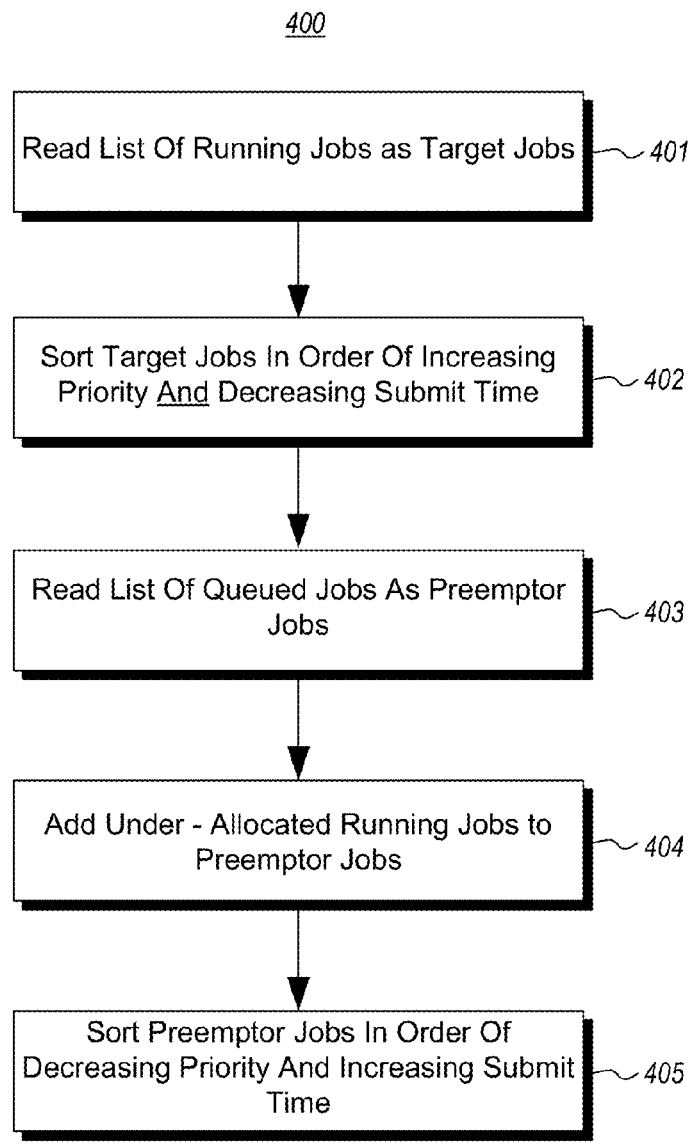
FIG. 4 illustrates a flowchart of a more detailed method for preparing for a scheduling pass that may be performed by the scheduler of FIG. 2.
Figure 5:
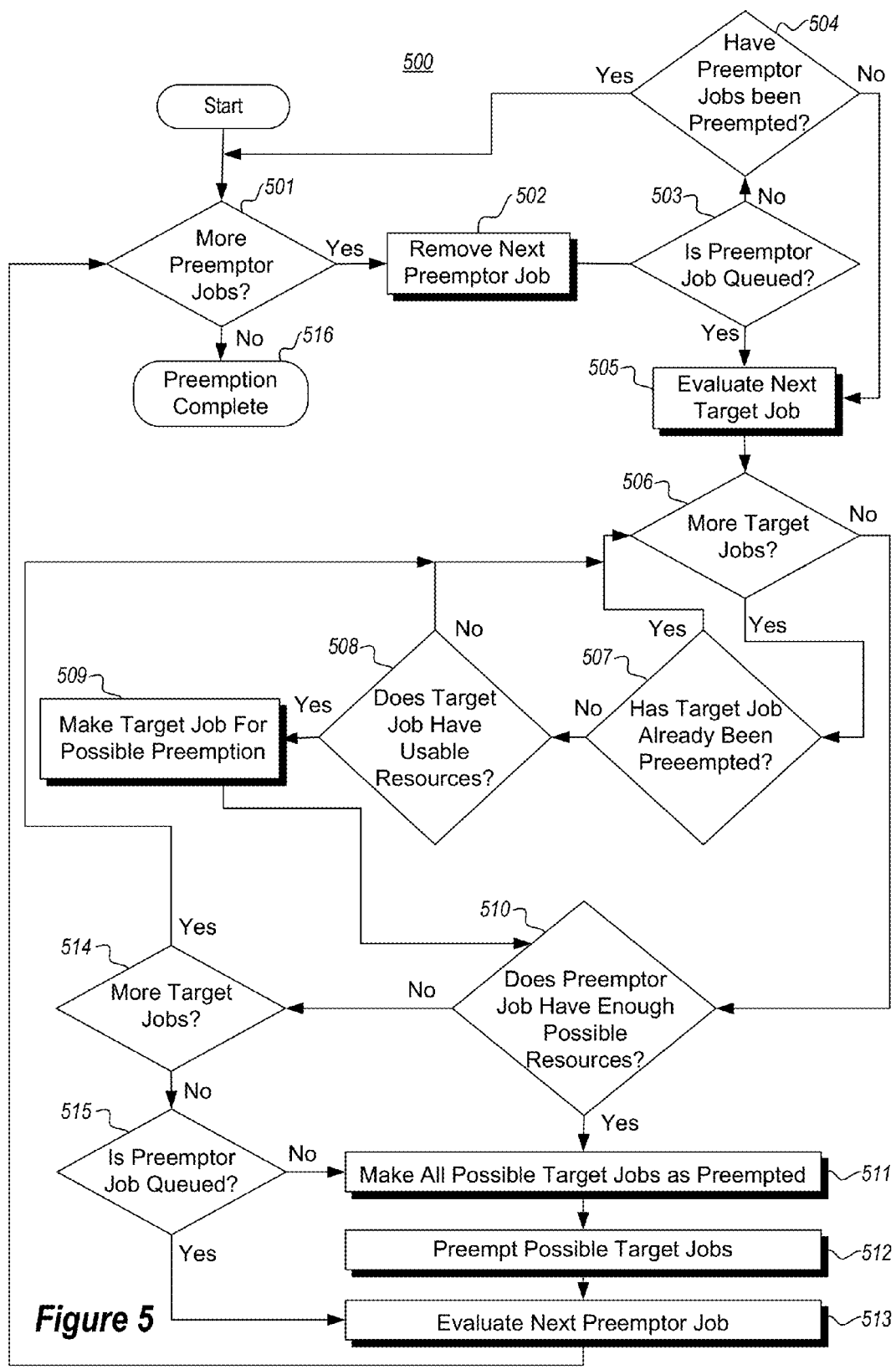
FIG. 5 illustrates a flowchart of a more detailed method for completing the scheduling pass that was prepared for in FIG. 4.

A more specific method for performing the method 300 of FIG. 3 will be described with respect to FIGS. 4 and 5. FIG. 4 illustrates a flowchart of a more detailed method 400 for preparing for a scheduling pass. Furthermore, FIG. 5 illustrates a flowchart of a more detailed method 500 for completing the scheduling pass that was prepared for in FIG. 4. The methods 400 and 500 may likewise be performed by the scheduler 210 of FIG. 2. The methods 400 and 500 will be described with frequent reference to FIG. 2, and with frequent reference to the application example.

The scheduling pass may be initiated according to the method 400 by first reading a list of running jobs as potential target jobs (act 401). In the application example, suppose that the following table is the list of running jobs and associated metadata.

TABLE 1

| Job ID | Priority | Start Time | Min Allocation | Max Allocation | Current Allocation | Possibly Preempted |
|---|---|---|---|---|---|---|
| A | 2 | 20 minutes ago | 5 | 5 | 5 | No |
| B | 1 | 5 hours ago | 5 | 20 | 20 | No |
| C | 3 | 3 days ago | 1 | 40 | 10 | No |
| D | 1 | 2 minutes ago | 1 | 10 | 5 | No |
| E | 2 | 2 hours ago | 1 | 20 | 20 | No |

As illustrated in Table 1, each job includes an identifier (in the Job ID column), a priority, a start time, a minimum processing resources allocation, a maximum processing resources allocation, a currently allocated processing resources allocation, and a possible preempted status.

The job identifier may be any identifier that is unique amongst the queued and running jobs. In this example, running jobs are assigned a capital letter A through E, whereas queued jobs are assigned a lower-case letter a, b, or c. For instance, running jobs A through E may correspond to running jobs 201A through 201E of FIG. 2, and queued jobs a through c may corresponding to queued jobs 202a through 202c of FIG. 2.

The principles of the present invention are also not limited to the manner in which priority is identified, although in this example, a priority of "3" is the highest priority, a priority of "2" is an intermediate priority, and a priority of "1" is the lowest priority.

The submit time may be expressed in terms of absolute time, although in the table, the submit time is expressed in terms of time relative to the current time. The submit time represents the time that the job was submitted to the scheduler thereby being entered into the queue.

The minimum allocation expresses the number of processing resources that are to be used at a minimum for processing a processing job. If the processing resources are any less than the minimum allocation, the processing job is not to be processed. Since Table 1 lists running jobs, the current allocation is always at least the minimum allocation, else the processing job would not be running The maximum allocation expresses the maximum number of processing resources that are to be used to process a processing job. In the application example, there is a maximum allocation expressed. However, some processing jobs may not have a maximum allocation, indicating that the processing job is to receive as many processing resources as possible.

The current allocation expresses the current allocation of processing resources that are being used to currently process the processing job. In each case, the current allocation is greater than or equal to the minimum allocation, and equal to or less than the maximum allocation. In the application example, suppose there are 60 available processing resources. In this case, the sum of all of the current allocation equals 60, meaning that all of the processing resources are in their aggregate occupied executing a corresponding processing job.

Returning to FIG. 4, the target jobs are sorted in order to increasing priority, and decreasing submit time (act 402). Target jobs are sorted first by priority with lowest priority being highest on the list, and within each priority, the most recently submitted target jobs are nearer to the top of the sorted list. The resulting sorted list in the application example is derived from Table 1 and appears as follows in Table 2.

TABLE 2

| Job ID | Priority | Submit Time | Min Allocation | Max Allocation | Current Allocation | Possibly Preempted |
|---|---|---|---|---|---|---|
| D | 1 | 2 minutes ago | 1 | 10 | 5 | No |
| B | 1 | 5 hours ago | 5 | 20 | 20 | No |
| A | 2 | 20 minutes ago | 5 | 5 | 5 | No |
| E | 2 | 2 hours ago | 1 | 20 | 20 | No |
| C | 3 | 3 days ago | 1 | 40 | 10 | No |

Returning again to FIG. 4, the scheduler then reads the list of queued jobs as preemptor jobs (act 403)). Assume, in the application example, that the following Table 3 shows the queued jobs and the initial list of preemptor jobs.

TABLE 3

| Job ID | Priority | Submit Time | Min Allocation | Max Allocation | Current Allocation |
|---|---|---|---|---|---|
| a | 2 | 1 minute ago | 2 | 5 | 0 |
| b | 3 | 30 seconds ago | 20 | 50 | 0 |
| c | 1 | 15 seconds ago | 1 | 5 | 0 |

Returning to FIG. 4, the scheduler then adds under-allocated running jobs to the list of preemptor jobs (act 404). Under-allocated running jobs are those running jobs that have a current allocation of processing resources that is less than their maximum allocation of processing resources. Running jobs that have no maximum allocation of processing resource are always under-allocated, as they may always be assigned further processing resources. Examining Table 1, the under-allocated running jobs are processing jobs C and D. Adding these running jobs to the queued jobs of Table 3 yields the following Table 4.

TABLE 4

| Job ID | Priority | Submit Time | Min Allocation | Max Allocation | Current Allocation |
|---|---|---|---|---|---|
| a | 2 | 1 minute ago | 2 | 5 | 0 |
| b | 3 | 30 seconds ago | 20 | 50 | 0 |
| c | 1 | 15 seconds ago | 1 | 5 | 0 |
| C | 3 | 3 days ago | 1 | 40 | 10 |
| D | 1 | 2 minutes ago | 1 | 10 | 5 |

Returning to FIG. 4, the list of preemptor jobs is then sorted in order of decreasing priority and increasing submit time (act 405). In other words, the preemptor jobs are sorted with highest priority (priority 3) jobs appearing highest in the list, and within each priority, the least recently submitted job being highest on the list. The following Table 5 shows the sort operation results as applied to Table 4 as follows.

TABLE 5

| Job ID | Priority | Submit Time | Min Allocation | Max Allocation | Current Allocation |
|---|---|---|---|---|---|
| C | 3 | 3 days ago | 1 | 40 | 10 |
| b | 3 | 30 seconds ago | 20 | 50 | 0 |
| a | 2 | 1 minute ago | 2 | 5 | 0 |
| D | 1 | 2 minutes ago | 1 | 10 | 5 |
| c | 1 | 15 seconds ago | 1 | 5 | 0 |

Having now completed method 400 for initializing the scheduling pass, processing proceeds to method 500, in which the scheduling pass is completed.

The method 500 begins by evaluating whether or not there are more preemptor jobs (decision block 501). If there are not any preemptor jobs left in the list (No in decision block 501), then this is where the scheduling pass would end (act 516) with the preemption being completed. However, in this example, there are five preemptor jobs (Yes in decision block 505) as apparent from Table 5, and thus processing proceeds to act 502.

The scheduler then removes the next preemptor job (act 502). In the application example, the next preemptor job is job C, having the highest priority 3, and having begun running 3 days ago.

The scheduler then determines whether the subject preemptor job is queued (decision block 503). In the application example, the job C is not queued, but is running (No in decision block 503), and thus processing proceeds to decision block 504.

The scheduler then determines whether the preemptor job has been preempted in the scheduling pass (decision block 504). Here, the scheduling pass has only just begun and thus the preemptor job not been preempted (No in decision block 504), and thus processing proceeds to act 505.

The scheduler then evaluates the next target job against the preemptor job C (act 505), and proceeds to decision block 506, where it is determined whether or not there are any further target jobs to evaluate against the preemptor job (decision block 506). Since the scheduling pass has just begun, and referring to Table 2, there are still five target jobs to evaluate (Yes in decision block 506), and thus processing proceeds to decision block 507.

The scheduler determines if the target job D has already been preempted. As apparent from the possibly preempted flag in Table 2, target job D has not yet been preempted (No in decision block 507), and thus processing proceeds to decision block 508. However, if the target job D had already been preempted (Yes in decision block 507), then the scheduling pass continues to evaluate the preemptor job C against the next target job D.

However, here, the target job D has not been preempted (No in decision block 507), and thus the scheduler determines if the target job D has any processing resources that are usable by the preemptor job C (decision block 508). Decision block 508 also includes a check for whether the preemptor job (here preemptor job C) can preempt the target job (here target job D) (i.e., whether the preemptor job has a higher priority than the target job) If not, the target job is not considered to have processing resources that are usable to the preemptor job. If there were not any usable processing resources (No in decision block 507), then the scheduling pass continues to evaluate the preemptor job C against the next target job. However, assume that the processing resources of the target job D may be used by the preemptor job C. Furthermore, here the preemptor job C has a higher priority (priority 3) than the target job D (priority 1) (Yes in decision block 508), in which case processing proceeds to act 509. In this case, the current allocation of preemptor job C would be increased from 10 to 15 by preempting target job D.

The scheduler then marks the target job D as being possibly preempted (act 509), and then determines whether the preemptor job has enough possible resources (decision block 510). Here, the current allocation of preemptor job C has increased to 15, which is still less than the maximum allocation of 40. Accordingly, the preemptor job C does not have enough processing resources (No in decision block 510). The scheduler then determines if there are more target jobs (decision block 514) that could be preempted. In this case, the next target job would be target job B referring to Table 2 (Yes in decision block 514). Thus, preemptor job C would then be evaluated against target job B.

The scheduler determines if the target job B has already been preempted (decision block 507). As apparent from the possible preempted flag in Table 2, target job B has not yet been preempted (No in decision block 507), and thus processing proceeds to decision block 508. The scheduler determines if the target job B has any processing resources that are usable by the preemptor job C and confirms that the preemptor job C (priority 3) has a higher priority than target job B (priority 1) (decision block 508). Here, we assume that the processing resources of the target job B may be used by the preemptor job C (Yes in decision block 508), in which case processing proceeds to act 509. In this case, the current allocation of preemptor job C would be increased from 10 to 35 by preempting target job D (which has 5 available processing resources) and preempting target job B (which has 20 available processing resources).

The scheduler then marks the target job B as being possibly preempted (act 509), and then determines whether the preemptor job has enough possible resources (decision block 510). Here, the current allocation of preemptor job C has increased to 35, which is still less than the maximum allocation of 40. Accordingly, the preemptor job C does not have enough processing resources (No in decision block 510). The scheduler then determines if there are more target jobs (decision block 514) that could be preempted. In this case, the next target job would be target job A referring to Table 2 (Yes in decision block 514). Thus, preemptor job C would then be evaluated against target job A.

The scheduler determines if the target job A has already been preempted (decision block 507). As apparent from the possible preempted flag in Table 2, target job A has not yet been preempted (No in decision block 507), and thus processing proceeds to decision block 508. The scheduler determines if the target job A has any processing resources that are usable by the preemptor job C and whether the preemptor job C (priority 3) has a higher priority than the target job A (priority 2) (Yes in decision block 508), in which case processing proceeds to act 509. In this case, the current allocation of preemptor job C would be increased from 10 to 40 by preempting target job D (which has 5 available processing resources), preempting target job B (which has 20 available processing resources), and preempting target job A (which has 5 available processing resources).

The scheduler then marks the target job A as being possibly preempted (act 509), and then determines whether the preemptor job has enough possible resources (decision block 510). Here, the current allocation of preemptor job C has increased to 40, which is equal to the maximum allocation of 40 for preemptor job C. Accordingly, here, the preemptor job does have enough processing resources (Yes in decision block 510).

Then, all of the target jobs marked for possible preemption (processing jobs D, B, and A in this example) are marked as preempted (act 511). Then, preemption occurs (act 512). If only part of the processing resources for a running job were preempted, and that running job still has more than the minimum allocation, then that running job may be allowed to continue to run, even though part of its processing resources were preempted.

The scheduler then evaluates the next preemptor job (act 513). Referring to Table 5, the next preemptor job would be job b, a queued job. Since there were more preemptor jobs (Yes in decision block 501), the next processing job b is removed from the list of preemptor jobs (act 502). The preemptor job is queued (Yes in decision block 503), and thus the preemptor job b is evaluated against the next target job, which is target job E referring to Table 2 (act 505, and Yes in decision block 506). The target job E has not yet been preempted (No in decision block 507). Furthermore, the target job E does have usable resources and the preemptor job b (priority 3) has a higher priority than target job E (priority 2) (Yes in decision block 508). Accordingly, target job E is targeted for preemption. Here, the target job E has 20 usable processing resources, allowing the preemptor job b to begin running with all 20 usable processing resources previously allocated to target job E.

Here, the preemptor job b has a maximum allocation of 50. However, there is a minimum allocation of 20. The threshold in decision block 510 for determining whether the preemptor job has "enough" processing resources depends on whether the preemptor job is a running job or a queued job. As already demonstrated, for running jobs, the maximum allocation for the preemptor job is used as the threshold in decision block 510 for determining whether the preemptor job has enough processing resources. However, in the case of the preemptor job being a queued job, the minimum allocation for the preemptor job is used as the threshold in decision block 510 for determining whether the preemptor job has enough processing resources. Here, the preemptor job b would begin with 20 processing resources if the preemption of target job E were to occur (Yes in decision block 510). Accordingly, target job E is marked for preemption (act 511), target job E is preempted (act 512) allowing the preemptor job b to begin running, and then next preemptor job is evaluated (act 513).

Referring to Table 5, the next preemptor job would be job a, another queued job. Since there were more preemptor jobs (Yes in decision block 501), the next job a is removed from the list of preemptor jobs (act 502). The preemptor job a is queued (Yes in decision block 503), and thus the preemptor job a is evaluated against the next target job, which is target job C (act 505, and Yes in decision block 506). The target job C has not yet been preempted (No in decision block 507). Furthermore, the target job C does not have usable resources since the preemptor job a actually has a lower priority (priority 2) than the priority of the target job C (priority 3) (No in decision block 508). Accordingly, processing proceeds back to decision block 506.

There are no further target jobs (No in decision block 506) since target job C was the last in the list of Table 2. It is thus evaluated whether the preemptor job a has enough processing resource (decision block 510). Here, the preemptor job a was not able to gain any processing resources by preemption, and thus retains zero current allocation of processing resources. This is, of course, below the minimum allocation of 2 required for preemptor job a to begin running, that thus preemptor job a does not have enough processing resources (No in decision block 510). There are no further target jobs (No in decision block 514). Here, processing branches depending on whether or not the processing job is a queued job or a running job. Here, the preemptor job is queued (Yes in decision block 515), and thus the next preemptor job is evaluated (act 513).

Referring to Table 5, the next preemptor job would be job D, a running job. Since there were more preemptor jobs (Yes in decision block 501), the next processing job D is removed from the list of preemptor jobs (act 502). The preemptor job D is running (No in decision block 503). Accordingly, it is evaluated whether or not the preemptor job D has already been preempted (decision block 504). Here, the preemptor job D has already been preempted when it was evaluated as a target job against preemptor job C (Yes in decision block 504). Accordingly, processing proceeds to the next preemptor job.

Referring to Table 5, the next preemptor job would be job c, a queued job. Since there were more preemptor jobs (Yes in decision block 501), the next job c is removed from the list of preemptor jobs (act 502). The preemptor job c is queued (Yes in decision block 503), and thus the preemptor job c is evaluated against the next target job, which is target job C (act 505, and Yes in decision block 506). The target job C has not yet been preempted (No in decision block 507). Furthermore, the target job C does not have usable resources since the preemptor job c actually has a far lower priority (priority 1) than the priority of the target job C (priority 3) (No in decision block 508). Accordingly, processing proceeds back to decision block 506.

There are no further target jobs (No in decision block 506) since target job C was the last in the list of Table 2. It is thus evaluated whether the preemptor job c has enough processing resource (decision block 510). Here, the preemptor job c was not able to gain any processing resources by preemption, and thus retains zero current allocation of processing resources. This is, of course, below the minimum allocation of 1 required for preemptor job c to begin running, that thus preemptor job c does not have enough processing resources (No in decision block 510). There are no further target jobs (No in decision block 514). Furthermore, the preemptor job c is queued (Yes in decision block 515), and thus the next preemptor job is evaluated (act 513). However, here, there are no further preemptor jobs to evaluate (No in decision block 501), and thus processing ends (act 516).

Accordingly, the principles described herein allow for running jobs to preempt other running jobs by taking processing resources from the preempted running jobs. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, comprising:
   one or more processors; and
   at least one computer-readable storage device having stored thereon computer-executable instructions that are executable by the one or more processors to cause the computer system to perform a scheduling iteration of one or more jobs of the computer system, the computer-executable instructions including instructions that are executable to cause the computer system to perform at least the following:
   identify a plurality of running jobs that are running in the computer system and one or more queued jobs that are awaiting to be processed by the system, wherein each running job, and each queued job, specifies at least one of a minimum amount of processing resources that are to be allocated to processing the job and a maximum amount of processing resources that are to be allocated to processing the job;
   identify a plurality of preemptor jobs that are eligible to preempt one or more of the plurality of running jobs, the plurality of preemptor jobs comprising all of the one or more queued jobs and each running job of the plurality of running jobs that is currently running below the maximum amount of processing resources that are to be allocated to processing the job,
      wherein a threshold for determining whether one of the plurality of preemptor jobs preempts one or more of the plurality of running jobs is different for running jobs and queued jobs, wherein a threshold for running preemptor jobs to preempt other running jobs is met for a specific running preemptor job until the specified maximum amount of processing resources are available for assignment to the specific running preemptor job, and wherein a threshold for queued preemptor jobs to preempt other running jobs is met for a specific queued job until the specified minimum amount of processing resources will be available for assignment to the specific queued preemptor job after preempting a running job;
   preempt at least one of the plurality of running jobs with a first job that is included in the plurality of preemptor jobs sorted based on, at least one of job priority and time elapsed since job request, and based on the job's threshold being met,
      wherein at least the specified minimum amount of processing resources will be available for assignment to the first job after preempting the at least one of the plurality of running jobs; and
   process the first job using at least the specified minimum amount of processing resources including an amount of system processing resources that became available as a result of the at least one of the plurality of running jobs being preempted.

2. The computer system in accordance with claim 1, wherein the first job preempts running jobs from the plurality of running jobs until the first job is using the maximum amount of processing resources that are to be allocated to processing the first job.

3. The computer system in accordance with claim 1, wherein one of the one or more queued jobs preempts at least one of the plurality of running jobs, wherein the queued job is processed as a result of preempting the at least one of the plurality of running jobs.

4. The computer system in accordance with claim 1, wherein the system is a high performance computer system.

5. The computer system in accordance with claim 4, wherein the processing resources are compute nodes.

6. The computer system in accordance with claim 1, wherein in order to prevent subsequent preemption of a previously preempted job, the first job is verified to have not already been preempted prior to preempting the at least one of the plurality of running jobs with a different running job that was included in the identified preemptor jobs.

7. The computer system in accordance with claim 1, wherein the plurality of preemptor jobs includes a second job that was included in the identified preemptor jobs, the second job being lower in processing priority than the first job.

8. The computer system in accordance with claim 7, wherein the first job preempts the second job in order to provide additional processing resources to the first job.

9. The computer system in accordance with claim 1, wherein processing comprises: processing the first job using the specified maximum amount of system processing resources for the first job.

10. A method, implemented at a computer system that includes one or more processors, for performing a scheduling iteration of one or more jobs of the computer system, the method comprising:
  identifying a plurality of running jobs that are running in the computer system and one or more queued jobs that are awaiting to be processed by the system, wherein each running job, and each queued job, specifies at least one of a minimum amount of processing resources that are to be allocated to processing the job and a maximum amount of processing resources that are to be allocated to processing the job;
  identifying a plurality of preemptor jobs that are eligible to preempt one or more of the plurality of running jobs, the plurality of preemptor jobs comprising all of the one or more queued jobs and each running job of the plurality of running jobs that is currently running below the maximum amount of processing resources that are to be allocated to processing the job,
    wherein a threshold for determining whether one of the plurality of preemptor jobs preempts one or more of the plurality of running jobs is different for running jobs and queued jobs, wherein a threshold for running preemptor jobs to preempt other running jobs is met for a specific running preemptor job until the specified maximum amount of processing resources are available for assignment to the specific running preemptor job, and wherein a threshold for queued preemptor jobs to preempt other running jobs is met for a specific queued job until the specified minimum amount of processing resources will be available for assignment to the specific queued preemptor job after preempting a running job;
  preempting at least one of the plurality of running jobs with a first job that is included in the plurality of preemptor jobs sorted based on, at least one of job priority and time elapsed since job request, and based on the job's threshold being met,
    wherein at least the specified minimum amount of processing resources will be available for assignment to the first job after preempting the at least one of the plurality of running jobs; and
  processing the first job using at least the specified minimum amount of processing resources including an amount of system processing resources that became available as a result of the at least one of the plurality of running job being preempted.

11. The method in accordance with claim 10, wherein the first job preempts running jobs from the plurality of running jobs until the first job is using the maximum amount of processing resources that are to be allocated to processing the first job.

12. The method in accordance with claim 10, further comprising:
  preempting at least one of the plurality of running jobs with a queued job, wherein the queued job is processed as a result of the act of preempting.

13. The method in accordance with claim 10, wherein the system is a high performance computer system.

14. The method in accordance with claim 10, further comprising:
  verifying, in order to prevent subsequent preemption of a previously preempted job, that the first job has not already been preempted prior to preempting, the at least one of the plurality of running jobs with a different running job that was included in the identified preemptor jobs.

15. The method in accordance with claim 10, wherein the plurality of preemptor jobs includes a second job that was included in the identified preemptor jobs, the second job being lower in processing priority than the first job.

16. The method in accordance with claim 15, further comprising:
  preempting a different at least one of the plurality of running jobs with the second job; and
  processing the second job using increased processing resources of the system as a result of preempting that different at least one of the plurality of running jobs.

17. The method in accordance with claim 10, wherein processing comprises: processing the first job using the specified maximum amount of system processing resources for the first job.

18. A computer program product comprising at least one hardware storage device having stored thereon computer executable-instructions that are executable by one or more processors of a computer system to cause the computer system to perform a scheduling iteration of one or more jobs of the computer system, the computer-executable instructions including instructions that are executable to cause the computer system to perform at least the following:
  identify a plurality of running jobs that are running in the computer system and one or more queued jobs that are awaiting to be processed by the system, wherein each running job, and each queued job, specifies at least one of a minimum amount of processing resources that are to be allocated to processing the job and a maximum amount of processing resources that are to be allocated to processing the job;
  identify a plurality of preemptor jobs that are eligible to preempt one or more of the plurality of running jobs, the plurality of preemptor jobs comprising all of the one or more queued jobs and each running job of the plurality of running jobs that is currently running below the maximum amount of processing resources that are to be allocated to processing the job,
    wherein a threshold for determining whether one of the plurality of preemptor jobs preempts one or more of the plurality of running jobs is different for running jobs and queued jobs, wherein a threshold for running preemptor jobs to preempt other running jobs is met for a specific running preemptor job until the specified maximum amount of processing resources are available for assignment to the specific running preemptor job, and wherein the threshold for queued preemptor jobs to preempt other running jobs is met for a specific queued job until a specified minimum amount of processing resources will be available for assignment to the specific queued preemptor job after preempting a running job;

preempt at least one of the plurality of running jobs with a first job that is included in the plurality of preemptor jobs sorted based on, at least one of job priority and time elapsed since job request, and based on the job's threshold being met, wherein at least the specified minimum amount of processing resources will be available for assignment to the first job after preempting the at least one of the plurality of running jobs; and process the first job using at least the specified minimum amount of processing resources including an amount of system processing resources that became available as a result of the at least one of the plurality of running jobs being preempted.

* * * * *